(12) United States Patent
Fujiwara et al.

(10) Patent No.: US 10,243,195 B2
(45) Date of Patent: Mar. 26, 2019

(54) NONAQUEOUS ELECTROLYTE SECONDARY BATTERY

(71) Applicant: Panasonic Corporation, Osaka (JP)

(72) Inventors: Isao Fujiwara, Hyogo (JP); Hiromasa Yagi, Osaka (JP)

(73) Assignee: Panasonic Corporation, Osaka (JP)

( * ) Notice: Subject to any disclaimer, the term of this patent is extended or adjusted under 35 U.S.C. 154(b) by 53 days.

(21) Appl. No.: 15/196,135

(22) Filed: Jun. 29, 2016

(65) Prior Publication Data

US 2017/0062796 A1    Mar. 2, 2017

(30) Foreign Application Priority Data

Aug. 28, 2015   (JP) .................. 2015-168738

(51) Int. Cl.
| | | |
|---|---|---|
| H01M 2/34 | (2006.01) | |
| H01M 2/30 | (2006.01) | |
| H01M 2/26 | (2006.01) | |

(52) U.S. Cl.
CPC ............ *H01M 2/345* (2013.01); *H01M 2/26* (2013.01); *H01M 2/30* (2013.01); *H01M 2/305* (2013.01); *H01M 2200/20* (2013.01)

(58) Field of Classification Search
None
See application file for complete search history.

(56) References Cited

U.S. PATENT DOCUMENTS

| | | | | |
|---|---|---|---|---|
| 9,666,846 | B2* | 5/2017 | Yamauchi | ........... H01M 2/1276 |
| 2013/0095352 | A1* | 4/2013 | Yamauchi | ............... H01M 2/12 429/53 |
| 2013/0177788 | A1* | 7/2013 | Hasegawa | ............. H01M 2/348 429/62 |

FOREIGN PATENT DOCUMENTS

JP    2013-041839    2/2013

* cited by examiner

*Primary Examiner* — Basia A Ridley
*Assistant Examiner* — Christopher P Domone
(74) *Attorney, Agent, or Firm* — McDermott Will & Emery LLP

(57) ABSTRACT

A nonaqueous electrolyte secondary battery includes an electrode body and an electrolytic solution in an outer can and a cathode external terminal on the open-end side of the outer can. The battery further includes a current cutoff mechanism (CID). The CID is located on the electrical conduction pathway between the cathode external terminal and the electrode body and interrupts the electrical coupling therebetween in response to an increased internal pressure in the battery. The CID includes a seal lead, a diaphragm, and a dielectric film. The seal lead has a cylindrical opening on the electrode body side. The diaphragm tightly closes the cylindrical opening and, in response to the increased internal pressure in the battery, deforms to interrupt the electrical coupling between the electrode body and the seal lead. The dielectric film is on the electrode body side of the diaphragm.

5 Claims, 8 Drawing Sheets

NONAQUEOUS ELECTROLYTE SECONDARY BATTERY

BACKGROUND

1. Technical Field

The present disclosure relates to a nonaqueous electrolyte secondary battery.

2. Description of the Related Art

Some nonaqueous electrolyte secondary batteries incorporate a current cutoff mechanism (CID), a mechanism that detects an overcharged state and interrupts the current. A commonly used type of CID is a pressure CID, which physically interrupts the current when the internal pressure in the battery exceeds a predetermined limit.

A CID includes, for example, a seal lead and a diaphragm. The seal lead is electrically coupled to an external terminal, and the diaphragm is electrically coupled to an electrode body housed in an outer can. In a configuration in which the seal lead and the diaphragm are connected with the diaphragm electrically coupling the electrode body and the external terminal, the CID interrupts the electrical coupling between the electrode body and the external terminal by deforming the diaphragm in response to an increase in the internal pressure in the battery (refer to Japanese Patent No. 5582182).

SUMMARY

CI Ds of the type disclosed in Japanese Patent No. 5582182 may experience a fracture of the diaphragm when the diaphragm deforms in response to an increased internal pressure in the battery. A fracture of the diaphragm can cause electrical contact to be established between the electrode body and the external terminal via the electrolytic solution, potentially leading to incomplete interruption of current.

In one general aspect, the techniques disclosed here feature a nonaqueous electrolyte secondary battery. The nonaqueous electrolyte secondary battery includes an outer can, an electrode body and an electrolytic solution in the outer can, and an external terminal on an open-end side of the outer can. The battery further includes a current cutoff mechanism. The current cutoff mechanism is located at any point on an electrical conduction pathway between the external terminal and the electrode body and interrupts electrical coupling therebetween in response to an increase in an internal pressure in the battery. The current cutoff mechanism includes a seal lead, a diaphragm, and a dielectric film. The seal lead has a cylindrical opening on an electrode body side. The diaphragm tightly closes the cylindrical opening and, in response to the increase in the internal pressure in the battery, deforms to interrupt electrical coupling between the electrode body and the seal lead. The dielectric film is on the electrode body side of the diaphragm.

The present disclosure provides a nonaqueous electrolyte secondary battery equipped with a highly reliable CID.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
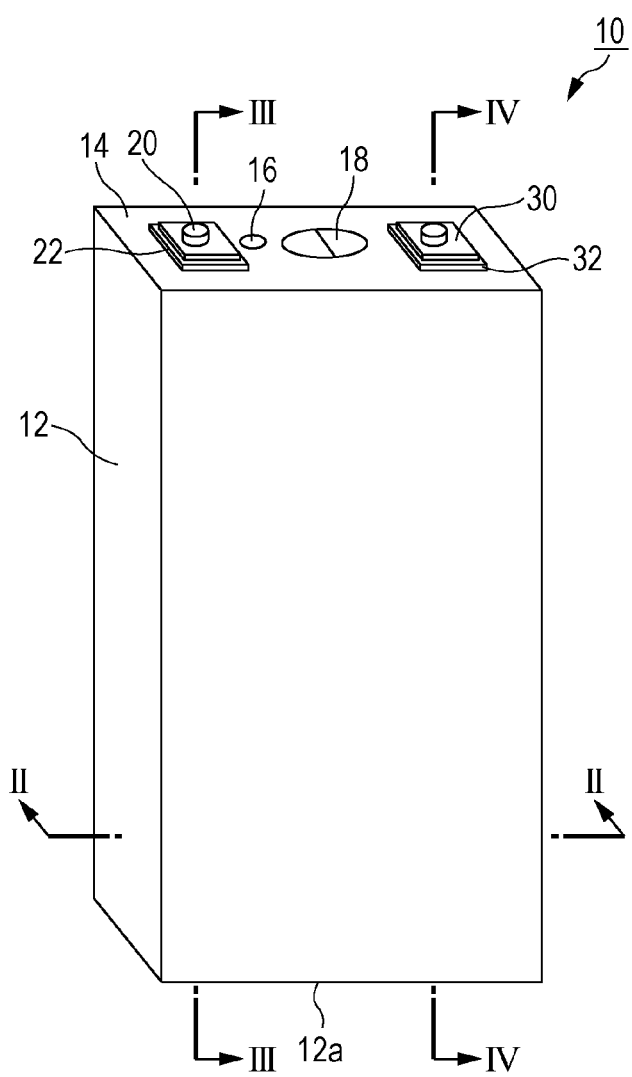
FIG. 1 is a perspective view of a nonaqueous electrolyte secondary battery as an example of an embodiment.

The construction of a nonaqueous electrolyte secondary battery includes an electrode body and a nonaqueous electrolyte (electrolytic solution) housed in an outer can and a top plate that seals the open-end side of the outer can. The electrode body is composed of a cathode and an anode each having an active material layer, and the top plate holds external terminals. In addition to these, a current cutoff mechanism (CID) is provided at any point on the electrical conduction pathway between one of the external terminals and the electrode body. The CID includes a seal lead, a diaphragm, and a dielectric film. The seal lead has a cylindrical opening on the electrode body side. The diaphragm tightly closes the cylindrical opening and, in response to an increase in the internal pressure in the battery, deforms to interrupt the electrical coupling between the electrode body and the seal lead. The dielectric film is on the electrode body side of the diaphragm.

The battery may be installed in a horizontal position with its external terminals on its vertical side face in, for example, automotive applications. In many of such cases, the cathode external terminal is on the lower side of the side face. The CID is typically provided on the cathode side, and therefore on the lower side of the side face. The electrolytic solution housed inside the battery is present on the lower side of the battery in the vertical direction, i.e., in the vicinity of the CID, when the battery is in a horizontal position.

Typically, the battery is charged in a controlled manner so that the voltage will fall within a predetermined range (e.g., 3.0 V or more and 4.2 V or less). When an excess of current is supplied to the battery because of an event such as a malfunction of the charger due to its failure, however, the battery can be overcharged, or charged beyond the upper limit of the predetermined range of voltage (e.g., 4.2 V).

CIDs, installed in batteries as a countermeasure against this type of overcharging, interrupt the current when the internal pressure in the batteries exceeds a predetermined limit. In an overcharged battery, components of the electrolytic solution, such as a nonaqueous solvent, are electrolyzed, and a gas is generated. In response to the generation of the gas, the diaphragm of the CID deforms to interrupt a conduction pathway in the battery. As a result, any further overcharging is prevented.

However, a further increase in the internal pressure in the battery in an overcharged state can cause the diaphragm to deform to such an extent that it fractures. In particular, when the battery is in a horizontal position, such a fracture causes the electrolytic solution housed in the outer can to leak through the break in the diaphragm and reach an external terminal. Electrical contact is established between the electrode body and the external terminal via the electrolytic solution, resulting in incomplete interruption.

After extensive research to solve this problem, the inventor found that if there is a dielectric film on the electrode body side of the diaphragm, the electrolytic solution does not reach the external terminal, and therefore the current remains interrupted, even when the diaphragm fractures. Based on these findings, the inventor devised this embodiment. This embodiment solves the above problem without changing the current design; it uses no space-consuming anti-overcharging mechanism that would cause a loss of volume energy density.

The following describes the details of an example of an embodiment with reference to drawings. The drawings referenced in the description of the embodiment are schematics, and the relative dimensions and other details of the illustrated components are not necessarily to scale. The following description should be considered when any specific relative dimensions or other details of a component are determined.

Figure 2:
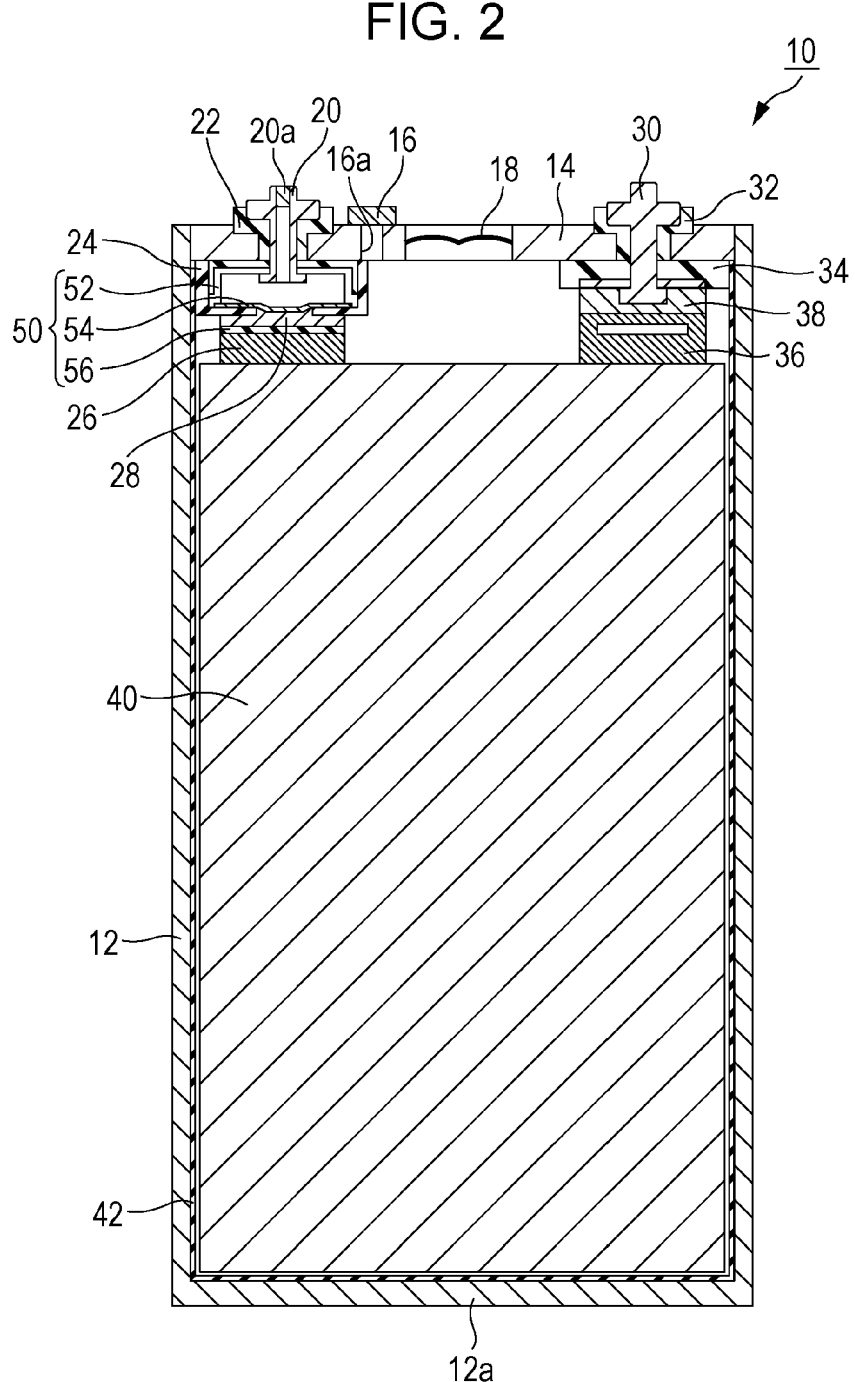
FIG. 2 is a cross-section taken along line II-II in FIG. 1.

FIG. 1 is a perspective view of a nonaqueous electrolyte secondary battery 10 as an example of an embodiment. FIG. 2 is a cross-section taken along line II-II in FIG. 1. The nonaqueous electrolyte secondary battery 10 includes an outer can 12 and a top plate 14. The outer can 12 is bottomed and has an opening, and the top plate 14 tightly closes this opening. The outer can 12 is a bottomed tube-like rectangular container in which an electrode body 40 is housed with an electrolytic solution. The electrode body 40 is composed of a cathode and an anode each having an active material layer. The outer can 12 has a bottom 12a, and the opening is positioned to face the bottom 12a. The top plate 14, tightly closing the outer can 12 like a lid, holds a stopper 16, a gas outlet valve 18, a cathode external terminal 20, and an anode external terminal 30. The stopper 16 seals an injection hole 16a through which the electrolytic solution is injected. The gas outlet valve 18 is used to discharge the gas in the battery to the outside of the battery and operates at a pressure higher than the pressure at which a CID 50 (described hereinafter) operates. The outer can 12 and the top plate 14 are desirably made of a metal that is stable at the potentials of the cathode. For example, these components can be made of aluminum or an aluminum alloy.

The cathode external terminal 20 provides electrical contact between an external power supply and the cathode. The anode external terminal 30 provides electrical contact between the external power supply and the anode. As illustrated in FIG. 2, the cathode external terminal 20 has a plug 20a. When the outer can 12 cannot withstand the pressure of a gas generated therein, the plug 20a is pushed out of the cathode external terminal 20 to let the gas out.

The cathode external terminal 20 is on the top plate 14 but is electrically isolated from the top plate 14 by an insulating gasket 22 and a cathode insulator 24. The anode external terminal 30 is on the top plate 14 but is electrically isolated from the top plate 14 by an insulating gasket 32 and an anode insulator 34. It is desired that the gaskets 22 and 32, the cathode insulator 24, and the anode insulator 34 be all made of resin.

As illustrated in FIG. 2, the outer can 12 houses the electrode body 40. The electrode body 40 is housed covered with an insulating sheet 42. The insulating sheet 42 is desirably in the shape of, for example, a folded box that fits in the inner walls of the outer can 12 or a bag that covers the electrode body 40.

There is a cathode tab 26 at one end of the top plate 14 side of the electrode body 40 and an anode tab 36 at the other end. A cathode collector lead 28 is joined to the cathode tab 26. An anode collector lead 38 is joined to the anode tab 36. The cathode collector lead 28 is electrically coupled to the cathode external terminal 20 with a CID 50 therebetween. The anode collector lead 38 is electrically coupled to the anode external terminal 30.

Figure 3:
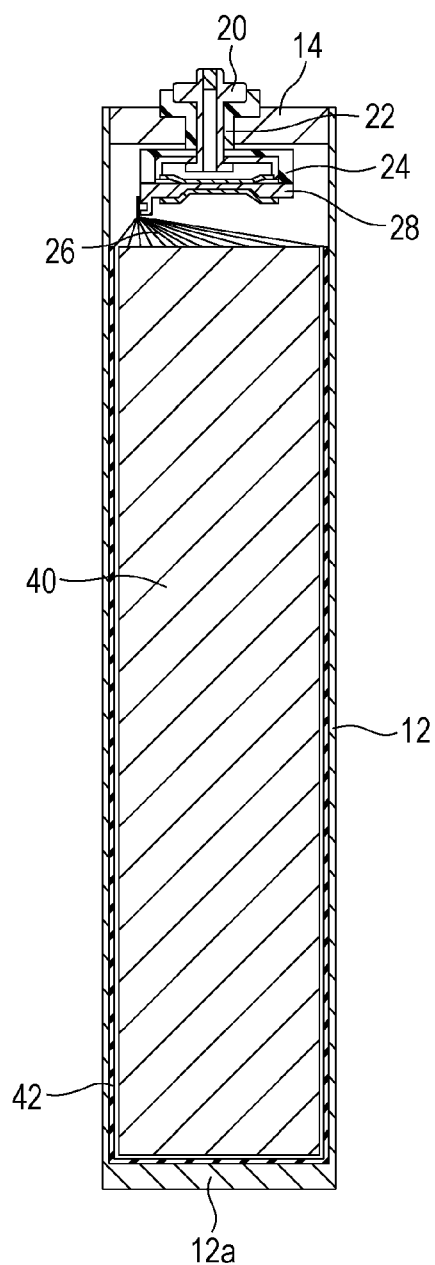
FIG. 3 is a cross-section taken along line III-III in FIG. 1.

FIG. 3 is a cross-section taken along line III-III in FIG. 1. As illustrated in FIG. 3, at the cathode, a multilayer cathode tab 26 is joined to the cathode collector lead 28. Although in FIG. 3 the cathode tab 26 and the cathode collector lead 28 are joined together at one point, there may be two or more junctions. For example, the use of two junctions leads to reduced variations in length between the layers of the cathode tab 26. There may be another conductive member that is connected to the cathode tab 26 and joins it to the cathode collector lead 28.

Figure 4:
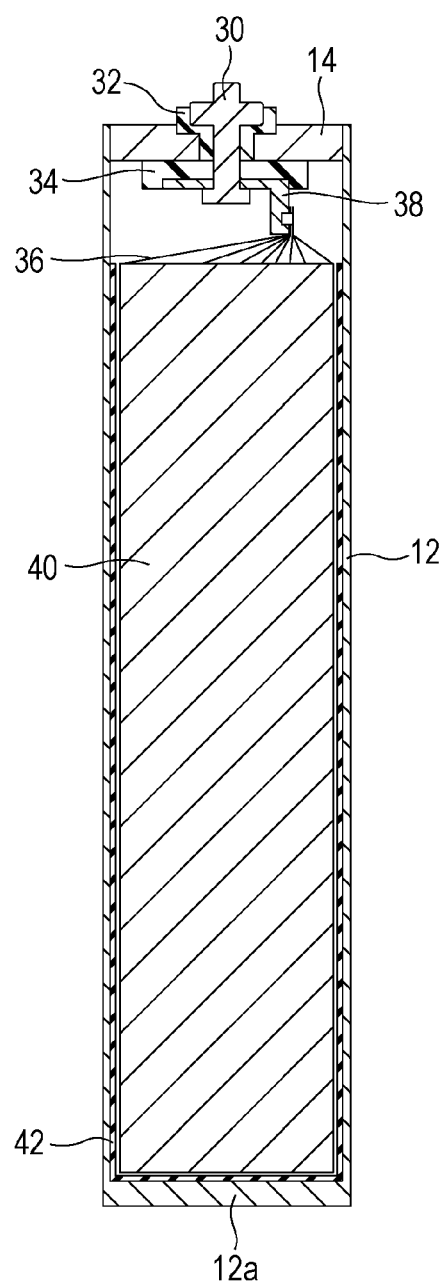
FIG. 4 is a cross-section taken along line IV-IV in FIG. 1.

FIG. 4 is a cross-section taken along line IV-IV in FIG. 1. As illustrated in FIG. 4, at the anode, a multilayer anode tab 36 is joined to the anode collector lead 38. In the same way as at the cathode, there may be two or more junctions between the anode tab 36 and the anode collector lead 38, although in FIG. 4 they are joined together at one point. For example, the use of two junctions leads to reduced variations in length between the layers of the anode tab 36. There may be another conductive member that is connected to the anode tab 36 and joins it to the anode collector lead 38.

The cathode can be any kind of cathode that is used in the nonaqueous electrolyte secondary battery 10. For example, the cathode is composed of a cathode core, such as a metal foil, and a cathode active material layer on the cathode core. The cathode core can be, for example, a foil of a metal that is stable at the potentials the cathode can have, desirably aluminum (Al) or an aluminum alloy, or a film with a layer of such a metal on its surface. More desirably, the cathode core is made from a mixture of iron in aluminum. The use of a mixture of iron in aluminum allows the manufacturer to improve the elongation of the cathode by heating. The cathode active material layer, which contains, for example, materials such as a conductive agent and a binder in addition to a cathode active material, is obtained by applying a mixture of the materials in a suitable solvent to the cathode core, drying the resulting coating, and then rolling the cathode core.

The cathode active material is in the shape of particles and can be, for example, a transition metal oxide that contains an alkali metal or has part of its transition metal substituted with any other element. The alkali metal can be, for example, lithium (Li) or sodium (Na), desirably lithium. The cathode active material may contain at least one selected from a group including scandium (Sc), manganese (Mn), iron (Fe), cobalt (Co), nickel (Ni), copper (Cu), and yttrium (Y). Desired of these transition metals are Mn, Co, Ni, and so forth. The at least one transition metal may be substituted in part with at least one selected from a group including magnesium (Mg), aluminum (Al), lead (Pb), antimony (Sb), and boron (B). Desired of these substituting elements are Mg, Al, and so forth.

Specific examples of such cathode active materials include lithium-containing transition metal oxides such as $LiCoO_2$, $LiNiO_2$, $LiMn_2O_4$, $LiMnO_2$, $LiNi_{1-y}Co_yO_2$ ($0<y<1$), $LiNi_{1-y-z}Co_yMn_zO_2$ ($0<y+z<1$), and $LiFePO_4$.

Cathode active materials can be used alone, and a combination of two or more can also be used.

The conductive agent is a conductive material in the form of, for example, a powder or particles and makes the cathode active material layer more conductive to electrons. The conductive agent is, for example, a conductive carbon material, metallic powder, or organic material. Specific examples include acetylene black, Ketjen black, and graphite as carbon materials, a powder of aluminum as a metal powder, and phenylene derivatives as organic materials. These conductive agents can be used alone, and a combination of two or more can also be used.

The binder maintains good contact between the cathode active material and the conductive agent and improves the adhesion of the cathode active material and other materials to the surface of the cathode core. The binder can be a material such as a fluoropolymer or a rubber-like polymer. Specific examples include polytetrafluoroethylene (PTFE), polyvinylidene fluoride (PVdF), and their altered forms as fluoropolymers and ethylene-propylene-isoprene copolymers and ethylene-propylene-butadiene copolymers as rubber-like polymers. The binder may be used in combination with a thickener such as carboxymethyl cellulose (CMC) or polyethylene oxide (PEO).

A process for the production of the cathode can be, for example, as follows. First, a cathode slurry is prepared that contains lithium cobalt oxide as a cathode active material, polyvinylidene fluoride (PVdF) as a binder, a carbon material as a conductive agent, and N-methylpyrrolidone (NMP). The cathode slurry is applied to both faces of a cathode core having a thickness of, for example, 15 μm, and the applied coating is dried. This gives a cathode composed of a cathode core and a cathode active material layer on each face thereof. The resulting cathode is rolled to spread the cathode active material layers to a predetermined thickness and then cut into a predetermined shape.

Figure 5A:
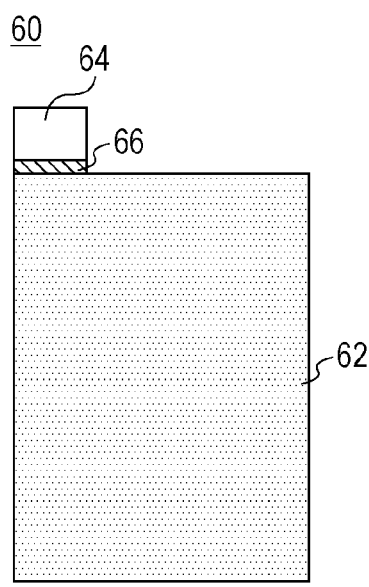
FIG. 5A is a plan view of a cathode according to an embodiment.

FIG. 5A is a plan view of a cathode 60 that has been cut out. As illustrated in FIG. 5A, the cathode 60 has a rectangular region in which a cathode active material layer 62 extends on each face of a cathode core, with a core-exposing section 64 at one end of a short side of the rectangular region. A stack of the core-exposing sections 64 of multiple cathodes 60 is the cathode tab 26. Desirably, the base 66 of the core-exposing section 64 is a dielectric layer or a protective layer that has a higher electrical resistance than the cathode core.

The anode is composed of, for example, an anode core, such as a metal foil, and an anode active material layer on the anode core. The anode core can be, for example, a foil of a metal that does not alloy with lithium at the potentials the anode can have, desirably copper, which is of low cost, high workability, and good electron conductivity, or a film with a layer of such a metal on its surface. The anode active material layer, which contains, for example, an anode active material and other materials such as a binder, is obtained by applying a mixture of the materials in water or any suitable solvent to the anode core, drying the resulting coating, and then rolling the anode core.

The anode active material can be any material capable of storing and releasing alkali metal ions. Examples of anode active materials that can be used include carbon materials, metals, alloys, metal oxides, metal nitrides, and alkali-metal-impregnated carbon and silicon. Examples of carbon materials include natural graphite, artificial graphite, and pitch carbon fiber. Specific examples of metals and alloys include lithium (Li), silicon (Si), tin (Sn), germanium (Ge), indium (In), gallium (Ga), lithium alloys, silicon alloys, and tin alloys. Anode active materials can be used alone, and a combination of two or more can also be used.

The binder can be a material such as a fluoropolymer or a rubber-like polymer as in the cathode, but it is desired to use a material such as a styrene-butadiene copolymer (SBR), which is a rubber-like polymer, or its altered form. The binder may be used in combination with a thickener such as carboxymethyl cellulose (CMC).

A process for the production of the anode can be, for example, as follows. First, an anode slurry is prepared that contains graphite as an anode active material, styrene-butadiene rubber (SBR) as a binder, carboxymethyl cellulose (CMC) as a thickener, and water. The anode slurry is applied to both faces of an anode core having a thickness of, for example, 8 μm, and the applied coating is dried. This gives an anode composed of an anode core and an anode active material layer on each face thereof. The resulting anode is rolled to spread the anode active material layers to a predetermined thickness and then cut into a predetermined shape.

Figure 5B:
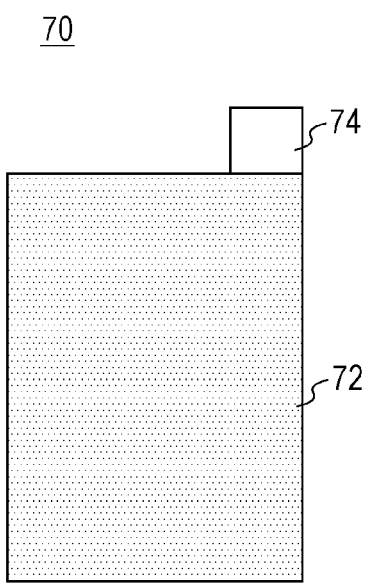
FIG. 5B is a plan view of an anode according to an embodiment.

FIG. 5B is a plan view of an anode 70 that has been cut out. As illustrated in FIG. 5B, the anode 70 has a rectangular region in which an anode active material layer 72 extends on each face of an anode core, with a core-exposing section 74 at one end of a short side of the rectangular region. A stack of the core-exposing sections 74 of multiple anodes 70 is the anode tab 36. Desirably, the anode 70 is slightly larger than the cathode 60 for better acceptance of lithium during charging.

Figure 6:
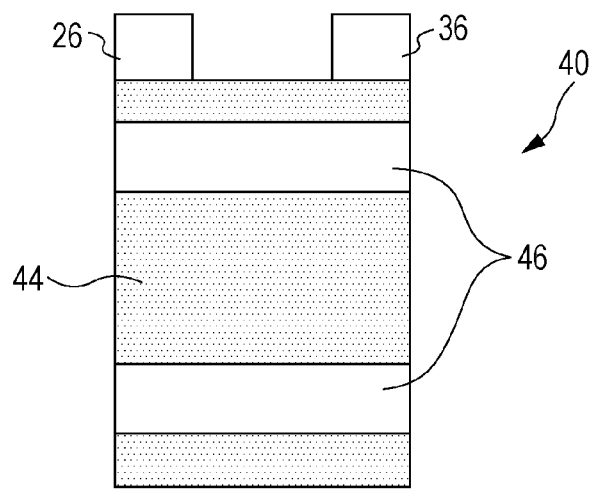
FIG. 6 is a plan view of an electrode body according to an embodiment.

FIG. 6 is a plan view of the electrode body 40. The electrode body 40 is a stack of multiple cathodes 60 and anodes 70 with separators 44 therebetween. When the outermost layers are anodes 70, the electrode body 40 is, for example, a stack of 100 cathodes 60 and 101 anodes 70 with polyolefin separators 44 therebetween. As illustrated in FIG. 6, the electrode body 40 has a cathode tab 26 at one end of a short side of its rectangular shape and an anode tab 36 at the other end. The cathode tab 26 is a stack of the core-exposing sections 64 of the 100 cathodes 60, and the anode tab 36 is a stack of the core-exposing sections 74 of the 101 anodes 70. There is a separator 44 on each face of the electrode body 40.

In the electrode body 40, the stack of cathodes 60, anodes 70, and separators 44 is desirably fastened using, for example, dielectric tape 46. Alternatively, there may be adhesive layers on the separators 44 with which the separators 44 are bonded to the cathodes 60 and the anodes 70. Another possible configuration is one in which the cathodes 60 and the anodes 70 are stacked with each cathode 60 in a bag constituted by welding two separators 44 along their edge.

Figure 7:
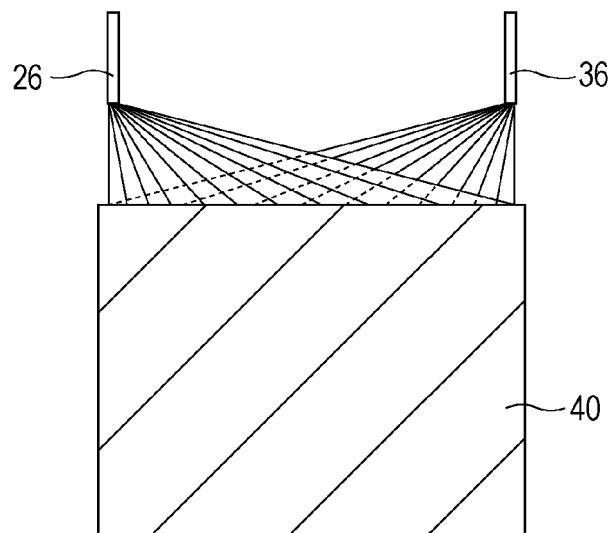
FIG. 7 is a side view of an electrode body according to an embodiment.

FIG. 7 is a side view of the electrode body 40. As illustrated in FIG. 7, the core-exposing sections 64 of the cathodes 60 may be joined together for the formation of the cathode tab 26 of the electrode body 40. Joining the core-exposing sections 64 of the cathodes 60 beforehand will make it easier to join the cathode tab 26 to the cathode collector lead 28. Like those of the cathodes 60, the core-exposing sections 74 of the anodes 70 may be joined together for the formation of the anode tab 36.

The nonaqueous electrolyte housed in the outer can 12 together with the electrode body 40 can be any kind of liquid electrolyte (electrolytic solution) that is used in nonaqueous electrolyte secondary batteries. The electrolytic solution contains a nonaqueous solvent and an electrolytic salt soluble in the nonaqueous solvent. The nonaqueous solvent can be, for example, a cyclic carbonate, a cyclic carboxylate, a cyclic ether, a linear carbonate, a linear carboxylate, a linear ether, a nitrile, or an amide. More specific examples include ethylene carbonate (EC) and propylene carbonate (PC) as cyclic carbonates, γ-butyrolactone (GBL) as a cyclic carboxylate, and ethyl methyl carbonate (EMC) and dimethyl carbonate (DMC) as linear carbonates. Particularly desired is a mixture of ethylene carbonate (EC), which is a cyclic carbonate and therefore has a high dielectric constant, and ethyl methyl carbonate (EMC), which is a linear carbonate and therefore has low viscosity. Halogenated derivatives of these nonaqueous solvents, which have one or more hydrogen atoms substituted with a halogen atom such as a fluorine atom, can also be used.

The electrolytic salt can be an alkali metal salt. It is more desired that the electrolytic salt be, for example, a lithium salt. Examples of lithium salts that can be used include those commonly used in the known nonaqueous electrolyte secondary batteries, such as $LiPF_6$, $LiBF_4$, and $LiClO_4$. These lithium salts can be used alone, and a combination of two or more can also be used.

The nonaqueous electrolyte secondary battery 10 desirably incorporates an anti-overcharge additive. The battery normally charges and discharges in a predetermined voltage range (e.g., 3.0 V or more and 4.2 V or less), and when the voltage exceeds the upper limit (e.g., 4.2 V) of this range and reaches a predetermined level (e.g., 5.0 V), the anti-overcharge additive decomposes and generates a gas. The gas generated from the anti-overcharge additive activates the CID 50 to prevent the battery from charging beyond the predetermined limit. It is desired to use lithium carbonate ($Li_2CO_3$) and cyclohexylbenzene (CHB) as anti-overcharge additives. Lithium carbonate can be added to the cathode active material layer, whereas cyclohexylbenzene can be added to the electrolytic solution.

Figure 8:
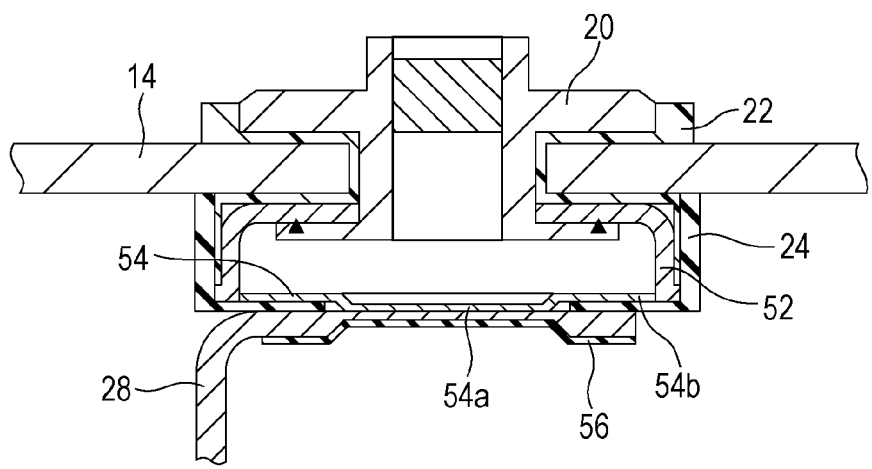
FIG. 8 is an enlarged view of an area around the CID in FIG. 3.
Figure 9:
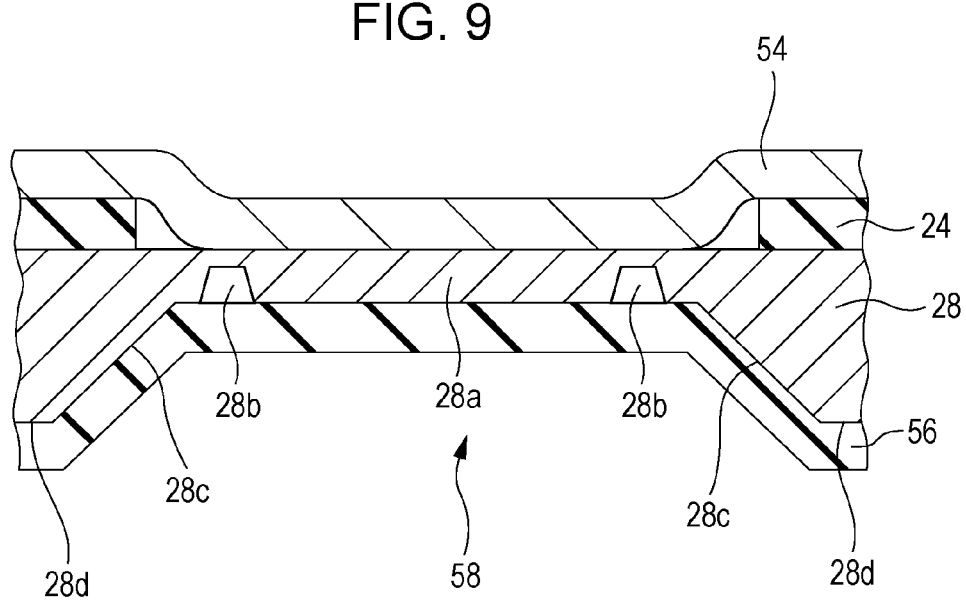
FIG. 9 is an enlarged view of an area around the cathode collector lead in FIG. 8.

FIG. 8 is an enlarged view of an area around the CID 50 in FIG. 3. FIG. 9 is an enlarged view of an area around the cathode collector lead 28 in FIG. 8. The CID 50, provided at any point on the electrical conduction pathway between the cathode external terminal 20 and the electrode body 40, interrupts the electrical coupling therebetween in response to an increase in the internal pressure in the battery. The CID 50 includes a seal lead 52, a diaphragm 54, and a dielectric film 56. The seal lead 52 has a cylindrical opening on the electrode body 40 side. The diaphragm 54 tightly closes the cylindrical opening and, in response to an increase in the internal pressure in the battery, deforms to interrupt the electrical coupling between the electrode body 40 and the seal lead 52. The dielectric film 56 is on the electrode body 40 side of the diaphragm 54. The seal lead 52 and the diaphragm 54 are desirably made of a metal that is stable at the potentials of the cathode. For example, these components can be made of aluminum or an aluminum alloy. The CID 50 may optionally be on the anode 70 side. In such a case, it is desired that the seal lead 52 and the diaphragm 54 be made of a metal that does not alloy with lithium at the potentials the anode can have. For example, they can be made of copper.

The conduction pathway on which the CID 50 is provided can be detailed as follows. The cathode external terminal 20, isolated from the top plate 14 by the gasket 22, is joined and electrically coupled to the seal lead 52. The seal lead 52 is joined and electrically coupled to the diaphragm 54 at the peripheral end of its cylindrical opening. The diaphragm 54 has a flat recess in the middle 54a thereof where it comes into contact with and is electrically coupled to the cathode collector lead 28. The cathode collector lead 28 is joined and electrically coupled to the electrode body 40. In this way, an electrical conduction pathway is constituted between the cathode external terminal 20 and the electrode body 40.

There is a cathode insulator 24 between the peripheral edge 54b of the diaphragm 54 and the cathode collector lead 28. When the diaphragm 54 deforms, its middle 54a comes out of contact with the cathode collector lead 28 joined to the electrode body 40. Since the peripheral edge 54b and the cathode collector lead 28 joined to the electrode body 40 are separated by the cathode insulator 24, the electrical coupling between the diaphragm 54 and the cathode collector lead 28 is interrupted.

On this conduction pathway, the dielectric film 56 is desirably in contact with the cathode collector lead 28 on the electrode body 40 side of the cathode collector lead 28. In some cases, the cathode collector lead 28 may have a thin portion 28a, and the dielectric film 56 may extend along the surface 28d of the cathode collector lead 28 through the space defined by this thin portion 28a and a peripheral portion 2c. The dielectric film 56 is desirably connected to the cathode collector lead 28 by at least one connection technique selected from adhesion, welding, and crimping at the edge thereof. When connected by this method, the dielectric film 56 does not lose connection with the cathode collector lead 28 even if the generation of a gas inside the battery forces the dielectric film 56 to stretch.

Desirably, at least part of the area of the cathode collector lead 28 where it is in contact with the diaphragm 54 is thinner than any other part as illustrated in FIG. 9 (a thin portion 28a). When the cathode collector lead 28 has a thin portion 28a, it is desired that there be a fragile portion 28b around the thin portion 28a. The fragile portion 28b is even thinner than the thin portion 28a and therefore is the least resistant to pressure in the cathode collector lead 28. In the case of an increased internal pressure in the battery, therefore, the fracture starts at the fragile portion 28b.

The periphery 28c of the thin portion 28a is desirably a tapered surface that narrows from the electrode body 40 toward the diaphragm 54. When the cathode collector lead 28 has a tapered peripheral portion 28c, the stretching of the dielectric film 56 following an increase in the internal pressure in the battery is stable as the tapered surface guides it. The tapered surface can be at any angle that ensures stable stretch of the dielectric film 56. For example, it is desired that the tapered surface be angled at 30° to 60°, more desirably 45°, from the surface 28d of the cathode collector lead 28.

Even if the diaphragm 54 deforms to such an extent that it fractures as a result of the operation of the CID 50, the dielectric film 56 prevents the occurrence of electrical contact between the electrode body 40 and the cathode external terminal 20 via the electrolytic solution and, therefore, incomplete interruption of current. The dielectric film 56 can be in any shape but is desirably round so that the thin portion 28a and the peripheral portion 28c can be covered.

The dielectric film 56 is desirably made of a material that has at least a certain degree of stretchability. For example, it is desired that the dielectric film 56 contain at least one selected from the group consisting of polyolefin resin, silicone resin, fluorocarbon resin, fluorocarbon rubber, and silicone rubber. When containing any of these materials, the dielectric film 56 does not fracture while stretching in response to an increased internal pressure in the battery caused by the generation of a gas during overcharging and is highly resistant to the electrolytic solution, i.e., unlikely to be damaged even if exposed to the electrolytic solution.

Furthermore, the dielectric film 56 is desirably housed in a housing space 58 constituted by the peripheral portion 28c and thin portion 28a of the cathode collector lead 28. Configurations in which the dielectric film 56 is housed in the housing space 58 allow for more options for the stretchability and material of the dielectric film 56.

Figure 10:
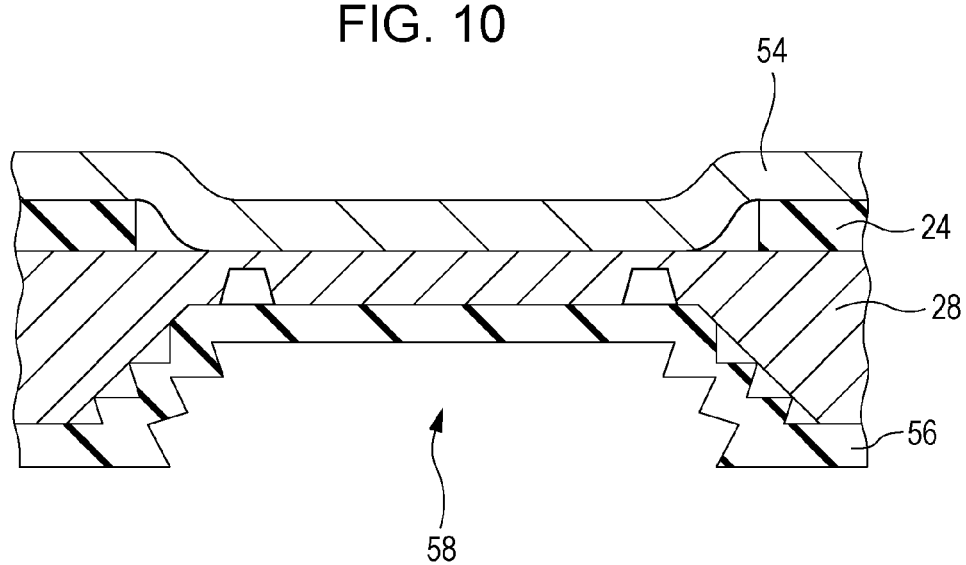
FIG. 10 illustrates a variation of a dielectric film according to an embodiment.

FIG. 10 illustrates a variation of the dielectric film 56. As illustrated in FIG. 10, the dielectric film 56 can be, for example, one that has pleats that allow it to stretch and contract. This embodiment allows for the use of a dielectric film 56 that is highly resistant to the electrolytic solution but not very stretchable (e.g., cellulose resin or imide resin).

Figure 11:
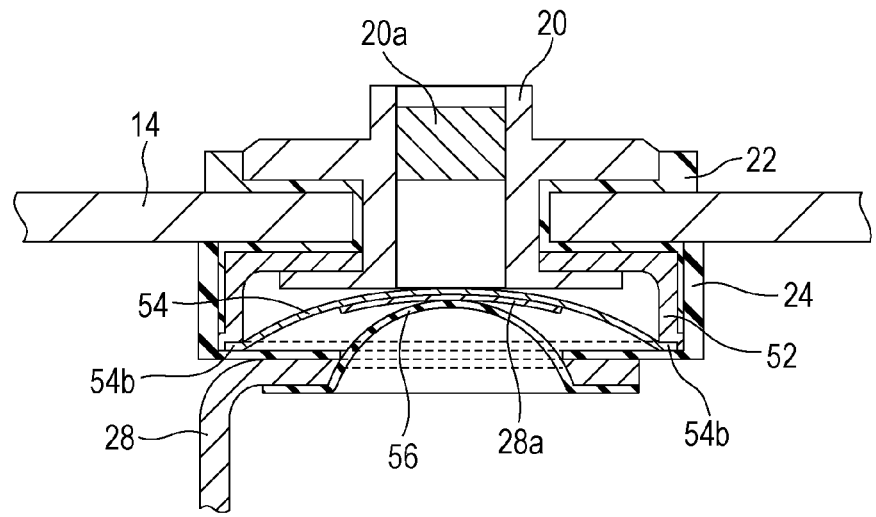
FIG. 11 illustrates the operation of a CID.

The following describes the operation of the CID 50. The CID 50 operates when, for example, the battery is charged beyond its predetermined range of voltage because of an event during charging such as a malfunction of the charger due to its failure. FIG. 11 illustrates the CID 50 in operation.

First, the nonaqueous electrolyte secondary battery 10 is installed in a horizontal position if it is used in, for example, automotive applications. When the battery needs to be charged, it starts to charge up to a predetermined upper limit of a voltage range that has been specified beforehand. The battery usually finishes charging when the voltage reaches the predetermined upper limit, but in some cases it may be overcharged, or charged beyond the predetermined upper limit of voltage, because of an event during charging such as a malfunction of the charger.

When the voltage exceeds the predetermined upper limit, the nonaqueous solvent in the electrolytic solution decomposes, and a gas is generated. When the voltage further increases and reaches the level at which the anti-overcharge additive decomposes, a gas for activating the CID 50 is generated to stop overcharging, elevating the internal pressure in the battery. Once the internal pressure in the battery has increased, the fragile portion 28b of the cathode collector lead 28 cannot withstand the pressure and fractures.

As the internal pressure in the battery further increases, the dielectric film 56 stretches into the shape of an ark toward the diaphragm 54 forced by the pressure as illustrated in FIG. 11. As a result, the diaphragm 54 deforms into an ark toward the cathode external terminal 20, together with the thin portion 28a of the cathode collector lead 28. The diaphragm 54 becomes convex toward the cathode external terminal 20 but remains joined to the seal lead 52 at its peripheral edge 54b. This interrupts the electrical contact between the seal lead 52, which is electrically coupled to the cathode external terminal 20, and the cathode collector lead 28 and the diaphragm 54, which are electrically coupled to the electrode body 40. The electrical contact between the cathode external terminal 20 and the electrode body 40 is lost, and the current is interrupted.

If the internal pressure in the battery further increases after the operation of the CID 50, the diaphragm 54, which has already been convex, cannot withstand the pressure and fractures.

If the dielectric film 56 were not provided, the fractured diaphragm 54 would let the electrolytic solution housed in the outer can 12 leak through the break in the diaphragm 54 and reach the cathode external terminal 20. Once the electrolytic solution has reached the cathode external terminal 20 in this way, electrical contact established between the electrode body 40 and the cathode external terminal 20 makes the interruption of current incomplete.

In this embodiment, the dielectric film 56 continues to stretch even after the fracture of the diaphragm 54. The dielectric film 56, which does not break and is resistant to the electrolytic solution, blocks the flow of the electrolytic solution. Thus, the electrolytic solution does not reach the cathode external terminal 20 even when the nonaqueous electrolyte secondary battery 10 is in a horizontal position. The electrode body 40 and the cathode external terminal 20 can no longer make electrical contact via the electrolytic solution, and the interruption of current is maintained.

When the nonaqueous electrolyte secondary battery 10 according to this embodiment is overcharged in a horizontal position, the electrolytic solution does not reach the cathode external terminal 20 even after the fracture of the diaphragm 54. In the battery, therefore, the current remains interrupted.

Figure 12:
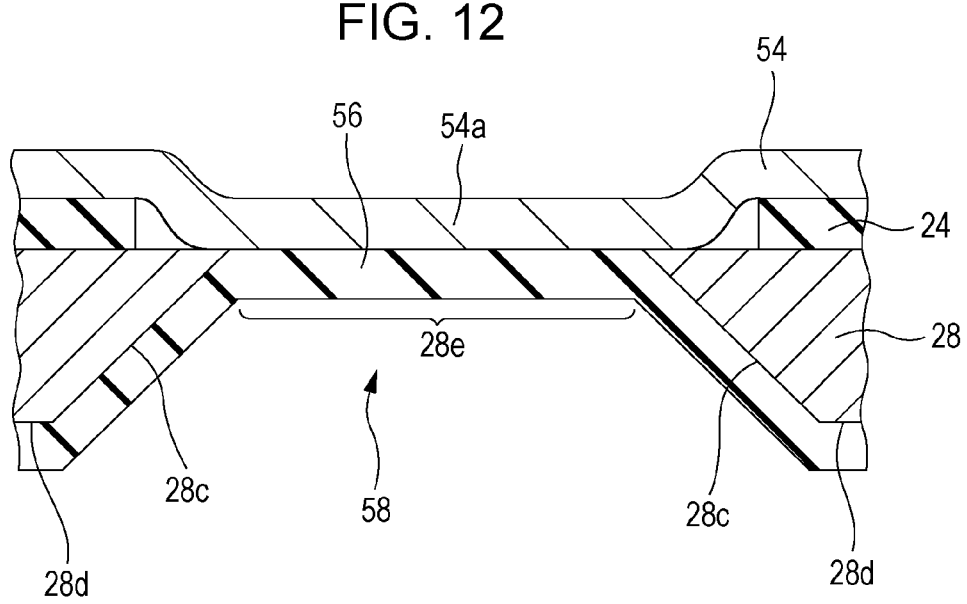
FIG. 12 illustrates a variation of the cathode collector lead illustrated in FIG. 9.

FIG. 12 illustrates a variation of the cathode collector lead 28. As illustrated in FIG. 12, part of the area of the cathode collector lead 28 where it is in contact with the diaphragm 54 may be an opening 28e through which the diaphragm 54 is exposed, instead of a thin portion 28a. It this case, it is desired that part of the middle 54a of the diaphragm 54 is in contact with the dielectric film 56. As in the case of a cathode collector lead 28 having a thin portion 28a, the dielectric film 56 may extend along the surface 28d of the cathode collector lead 28 through the space defined by the diaphragm 54 and a peripheral portion 28c.

The peripheral portion 28c of the cathode collector lead 28 is in contact with the diaphragm 54 at its top surface. The peripheral portion 28c is therefore electrically coupled to the diaphragm 54 at the point of contact. As for the taper angle of the peripheral portion 28c, the same applies as in the above case where the cathode collector lead 28 has a thin portion 28a.

Even if the cathode collector lead 28 has an opening 28e in the area where it is contact with the diaphragm 54, this configuration ensures that the CID 50 operates in the same way as in the above case where the cathode collector lead 28 has a thin portion 28a. In this configuration, too, the electrode body 40 and the cathode external terminal 20 cannot make electrical contact via the electrolytic solution, and the interruption of current is maintained.

The foreign object detectors and nonaqueous electrolyte secondary batteries according to the present disclosure are not limited to the above embodiment. They have, for example, the configurations according to the following items.

Item 1

A nonaqueous electrolyte secondary battery including: an outer can, an electrode body and an electrolytic solution in the outer can, and an external terminal on an open-end side of the outer can; and
    a current cutoff mechanism that is located at any point on an electrical conduction pathway between the external terminal and the electrode body and interrupts electrical coupling therebetween in response to an increase in an internal pressure in the battery,
    the current cutoff mechanism including a seal lead having a cylindrical opening on an electrode body side, a diaphragm that tightly closes the cylindrical opening and, in response to the increase in the internal pressure in the battery, deforms to interrupt electrical coupling between the electrode body and the seal lead, and a dielectric film on the electrode body side of the diaphragm.

Item 2

The nonaqueous electrolyte secondary battery according to item 1, further including a collector lead between the diaphragm and the electrode body, wherein
    at least part of an area of the collector lead where the collector lead is in contact with the diaphragm is thinner than any other part or is an opening through which the diaphragm is exposed, and an edge of the thin portion or the opening is a tapered surface that narrows from the electrode body toward the diaphragm.

Item 3

The nonaqueous electrolyte secondary battery according to item 1 or 2, wherein the dielectric film is housed in a housing space constituted by the edge and either the thin portion or the diaphragm.

Item 4

The nonaqueous electrolyte secondary battery according to any one of items 1 to 3, wherein the dielectric film contains at least one selected from the group consisting of polyolefin resin, silicone resin, fluorocarbon resin, imide resin, fluorocarbon rubber, and silicone rubber.

Item 5

The nonaqueous electrolyte secondary battery according to any one of items 1 to 4, wherein the dielectric film is connected to the collector lead by at least one connection technique selected from adhesion, welding, and crimping.

What is claimed is:

1. A nonaqueous electrolyte secondary battery comprising: an outer can, an electrode body and an electrolytic solution in the outer can, and an external terminal on an open-end side of the outer can; and
    a current cutoff mechanism that is located on an electrical conduction pathway between the external terminal and the electrode body, the current cutoff mechanism cutting off electrical connection between the external terminal and the electrode body in response to an increase in an internal pressure in the battery,
    the current cutoff mechanism including a seal lead having a cylindrical opening on an electrode body side, a diaphragm that closes the cylindrical opening and, in response to the increase in the internal pressure in the battery, deforms to cut off electrical connection between the electrode body and the seal lead, and a dielectric film on the electrode body side of the diaphragm for blocking the electrolytic solution from the external terminal when the diaphragm deforms.

2. The nonaqueous electrolyte secondary battery according to claim 1, further comprising a collector lead between the diaphragm and the electrode body, wherein
    at least part of an area of the collector lead where the collector lead is in contact with the diaphragm is thinner than any other part or is an opening through which the diaphragm is exposed, and an edge of the thin portion or the opening is a tapered surface that narrows from the electrode body toward the diaphragm.

3. The nonaqueous electrolyte secondary battery according to claim 2, wherein the dielectric film is housed in a housing space constituted by the edge and either the thin portion of the collector lead or the diaphragm.

4. The nonaqueous electrolyte secondary battery according to claim 1, wherein the dielectric film contains at least one selected from the group consisting of polyolefin resin, silicone resin, fluorocarbon resin, imide resin, fluorocarbon rubber, and silicone rubber.

5. The nonaqueous electrolyte secondary battery according to claim 1, wherein the dielectric film is connected to the collector lead by at least one connection method selected from adhesion, welding, and crimping.

* * * * *